Aug. 9, 1960 A. K. BERGMANN ET AL 2,948,780

AUTOMATIC TELEPHONE SYSTEM

Filed Nov. 7, 1956

4 Sheets-Sheet 1

INVENTORS
A. K. BERGMANN
J. BRYNILDSEN
J. C. G. BORGSTRÖM
J. B. GOOS
BY Hane and Nydick
ATTORNEYS INVENTORS
A. K. BERGMANN
J. BRYNILDSEN
J. C. G. BORGSTRÖM
J. B. GOOS
BY Hane and Nydick
ATTORNEYS INVENTORS
A. K. BERGMANN
J. BRYNILDSEN
J. C. G. BORGSTRÖM
J. B. GOOS
By Kane and Nydick
ATTORNEYS Aug. 9, 1960 A. K. BERGMANN ET AL 2,948,780

AUTOMATIC TELEPHONE SYSTEM

Filed Nov. 7, 1956 4 Sheets-Sheet 4

INVENTORS
A. K. BERGMANN
J. BRYNILDSEN
J. C. G. BORGSTRÖM
J. B. GOOS
BY Hane and Nydick
ATTORNEYS United States Patent Office 2,948,780

Patented Aug. 9, 1960

2,948,780

AUTOMATIC TELEPHONE SYSTEM

Anders Karlby Bergmann, Hagersten, Jan Brynildsen, Stockholm, and Johan Claes Georg Borgstrom and Jacques Bernhard Goos, Hagersten, Sweden, assignors to Telefonaktiebolaget L M Ericsson, Stockholm, Sweden, a corporation of Sweden Filed Nov. 7, 1956, Ser. No. 620,908

Claims priority, application Sweden Jan. 9, 1956

2 Claims. (Cl. 179—16)

The present invention relates to the transmission of signals in automatic telephone systems including a number of switching stages joined by means of lines, at least one of said switching stages consisting of cross bar switches and markers, and registers which by transmitting and receiving signals are setting up communications through said lines and switching stages. The markers and the registers both include relays for transmitting and relays for receiving the signals and also connecting relays for the switching from receiving to transmitting and vice versa.

Three fundamentally different systems for the setting of selectors from registers are known, viz. setting by means of dial impulses, setting by means of inverted impulses which indicate the movements of the selectors, and setting by means of markers. It is known by British Patent No. 640,508 that the registers set the markers by means of voice frequency signals.

Transmitting and receiving of voice frequency signals involves, however, a technique which is quite different from the earlier known automatic telephony and thus substantial costs will be incurred if old plants are to be converted for signalling by means of voice frequency signals. This invention has for its object to achieve by means of direct current signals the advantages which are inherent in the voice frequency signalling, viz. velocity and transmitting directly from registers to markers without repeating the signals in intermediate selection stages. This is achieved in such a way that a line joining two consecutive switching stages includes a relay which connects the line direct to one of said markers, and that the above mentioned relays for receiving the signals during a signal transmission are connected between ground and the speech wires of the lines on the receiving side while the relays for transmitting operate contacts through which the speech wires of the line on the transmitting side become connected to ground through one of two sources of current having opposite polarity in different combinations dependent on the kind of the signal. A high resistance control relay at the transmitting end of the line, is connected prior to the transmission of a signal between one speech wire of the line and one of said sources of current, and is operated when the relays for receiving have been connected to the second end of the line, said high resistance relay connecting the relays for transmitting by operation of said connecting relays.

By such signal system and by voice frequency signalling there are obtained a large number of different signals, which each can indicate a digit or a switching operation by means of a single current flow. By means of a current flow in one or the other of the directions of current to one, the second or both speech wires eight different signals may be obtained and by varying the current strength in the different signals the number of signals may by multiplied. Thus a rapid telesignal system is achieved. If three-wire lines are used, which is customary within local nets, also when the net contains a number of stations, the speech wires may be through-connected so that a direct metallic communication will be always maintained between transmitting register and a receiving marker. This condition may also be obtained for two-wire lines as will be shown below.

In the accompanying drawings,

Fig. 1 shows a general diagram for a part of a telephone plant.

Fig. 2 shows a part of a register REG.

Fig. 3 shows a second part of said register, in which said relays for transmitting and receiving are contained.

Fig. 4 shows a line equipment RL1 and the relays for transmitting and receiving in a marker M1.

Figure 2:
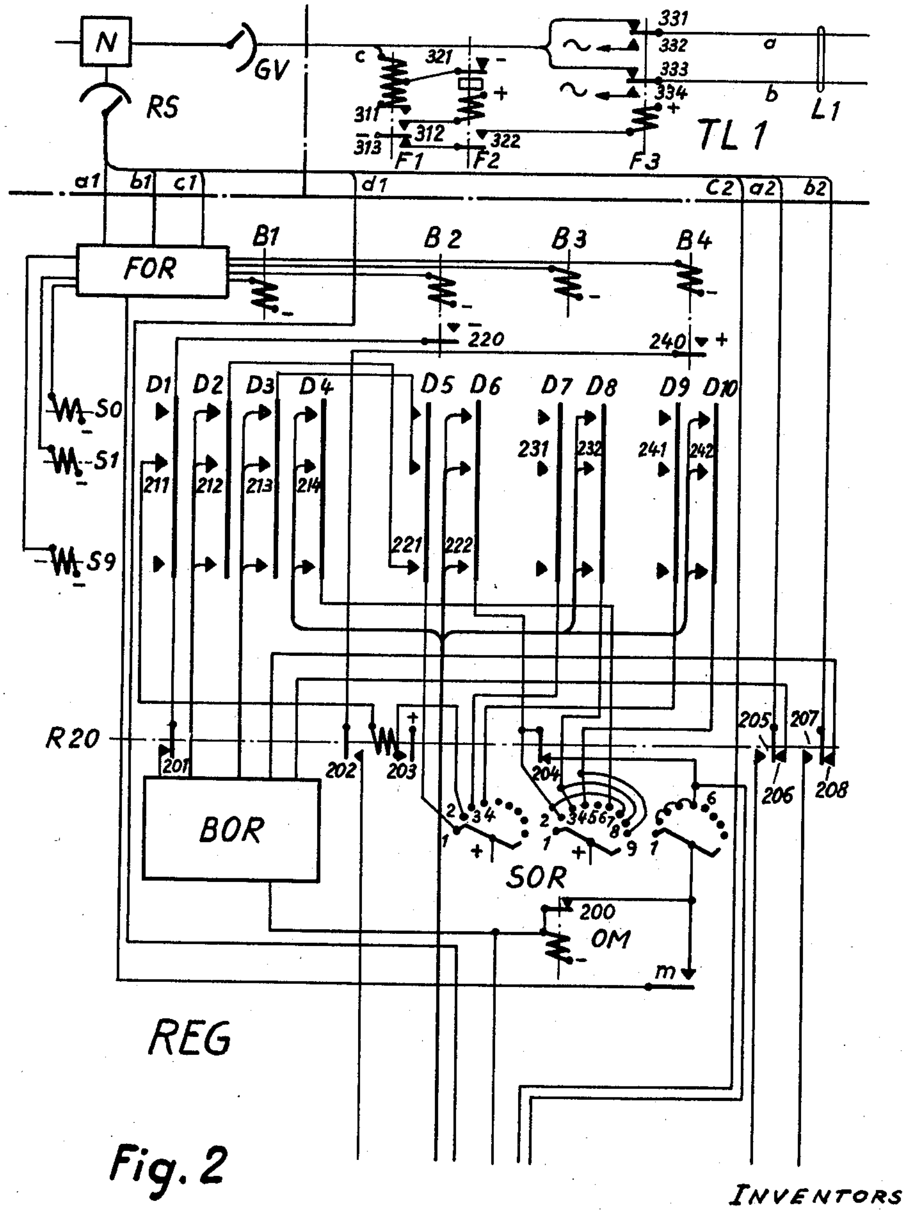
Figure 3:
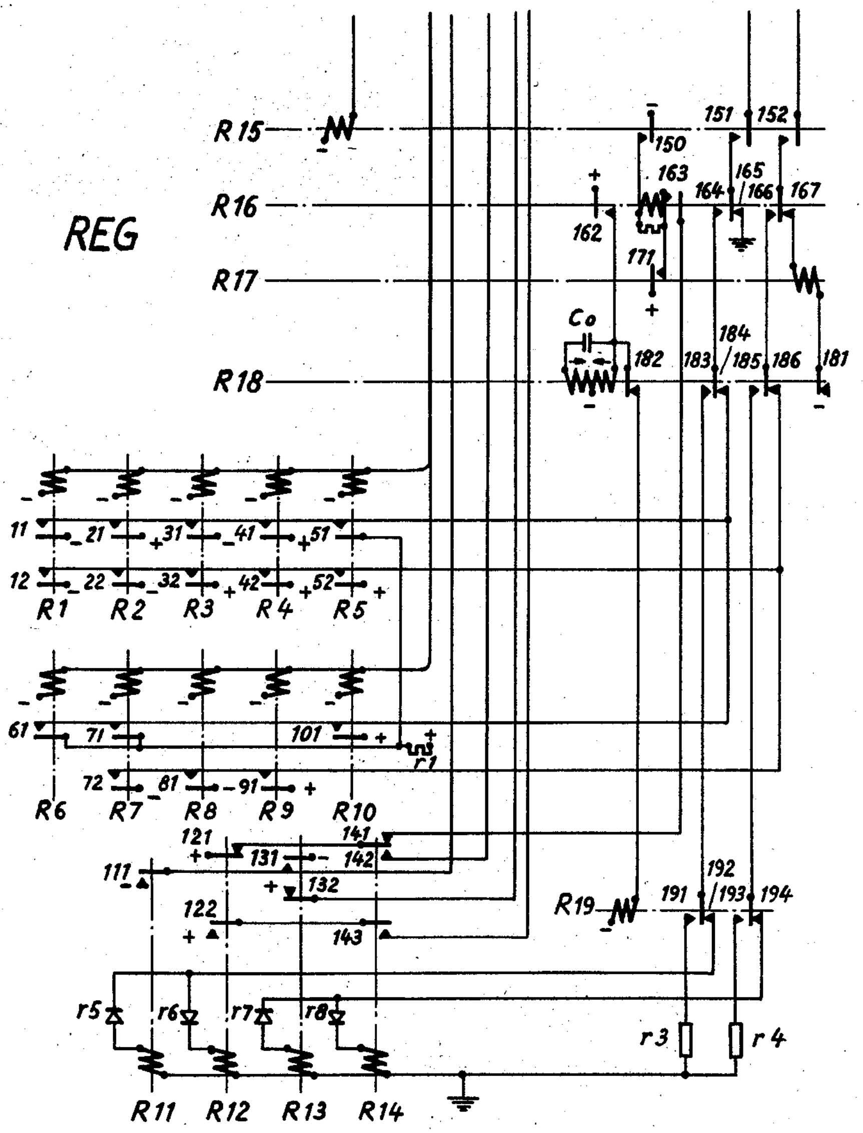
Figure 4:
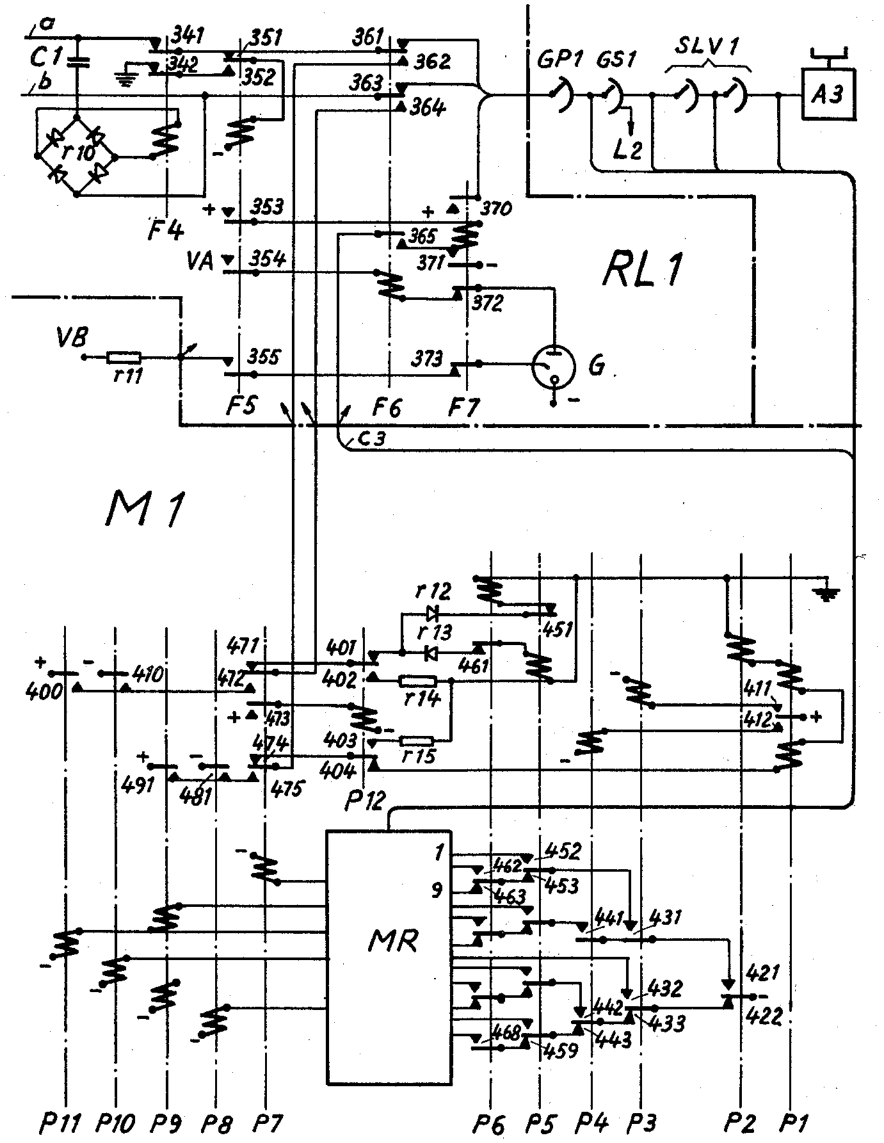

Fig. 2 should be placed above Fig. 3 and Fig. 4 to the right of Fig. 2.

Figure 1:
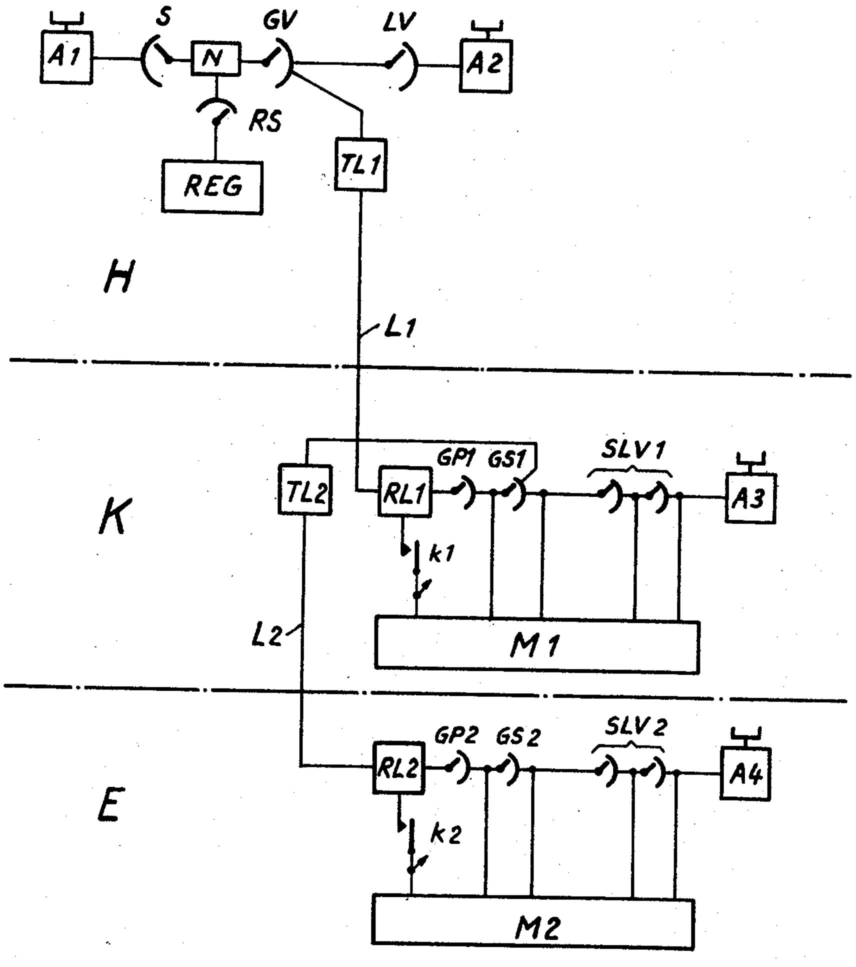
Figs. 1–4 show an example of the application of the invention.

Fig. 1 shows three exchanges within a local net which may have any extensions such as a main exchange H, a tandem exchange K and a terminal exchange E. Between the exchanges there are lines L1 and L2. In the main exchange there are line-finders S and group selectors GV and link circuits N to which registers REG are connected through register finders RS. Furthermore there are line selectors LV. The selectors S, GV and LV are machine-driven selectors, GV and LV of said selectors being set by means of inverted impulses. The tandem exchange and the terminal exchange are provided with cross bar switches and markers. In the figure there are only indicated group selector devices GP1–GS1 and GP2–GS2, respectively, for incoming traffic and combined finder- and line selection stages SLV1 and SLV2 and also markers M1 and M2, respectively. The lines L1 and L2 each have line equipments TL1, RL1 and TL2,RL2, respectively, which are identically equal for all lines, and contact devices *k1* and *k2*, respectively, for connection of the lines to the markers M1 and M2, respectively. The indications A1, A2, A3 and A4 refer to subscribers' instruments.

At a call from the apparatus A1, A1 is connected over a finder S to a link circuit N, said circuit in its turn being connected to a register REG through a register finder RS. The number of a called subscriber's apparatus A2, A3 and A4 is dialled and registered in the register REG. If the number of the apparatus A2 is dialled, the register sets the group selector GV and the line selector LV by means of inverted impulses. If the number of the apparatus A3 is dialled, the register REG sets the group selector GV by means of inverted impulses, the line L1 is selected and connected over the contact device *k1* to the marker M1. The register transmits a first signal, which indicates the tandem exchange K, receives an answering signal from the marker and transmits signals indicating the apparatus A3. The marker M1 sets the selectors GP1–GS1 and SLV1 so that a communication is obtained between the line L1 and the apparatus A3. If the calling person dials the number of the apparatus A4, the register REG transmits a signal to the marker M1, which indicates the terminal exchange E. The marker M1 sets the selectors GP1–GS1 so that the line L1 is interconnected with the line L2, which through the contact device *k2* is connected to the marker M2. The marker M1 transmits, if necessary, an answering signal which indicates that the last digit is to be repeated. The signal from the register REG indicating the terminal exchange E is repeated only if there are several subscribers' groups in E. The signal is received in the marker M2, which transmits an answering signal to the register indicating that the following digit is to be transmitted. Then the register transmits signals which indicate the apparatus A4. The marker M2 sets the selectors GP2–

GS2 and SLV2 so that a communication is obtained between the line L2 and the apparatus A4, and transmits an answering signal indicating if the apparatus A4 is free or busy.

The subscribers' numbers in the net are supposed to have 4 digits and the group selector GV is presumed to have 20 outlets, each intended for 500 subscribers' numbers. The exchange K and E may vary as to size and the traffic channel corresponding to the line L1 may comprise several five-hundreds subscribers' numbers, a number of outlets from the group selector GV, determined by the traffic, being united into a traffic channel. If the traffic channel comprises only one thousand, only the last three digits of the subscribers' number need be sent from the register to the marker M1. If the traffic channel comprises more than 1000 numbers, all four digits must be sent. It might be the case that the subscribers' numbers of the terminal exchange E have been provided with numbers having another first digit than the subscribers' number of the tandem exchange K. In this case also all digits in a subscribers' number must be transferred to the marker M1. To save time, the numbering within the net is so arranged that repeating of the digits is avoided to the utmost possible extent. Alterations in the numbering must however occur and in respect to this it is important that the circuit of the registers is not touched. This may also be arranged by means of answering signals, directed backwards, from the markers to the register in such a way that the markers, after a signal has been received, send a signal directed backwards, said signal indicating if earlier signals are to be repeated or if the next signal is to be sent. As a result, the same signal may be repeated to markers in several tandem exchanges located behind each other. The markers are not many in number and when altering the numbering pattern only a few markers are concerned and thus it will be more simple to make necessary alterations in the markers than in the registers.

The signal system will be described more in detail in connection with Figs. 2–4. To simplify the description it is supposed that the signals transmitted from the register to the tandem exchange K indicate digits in the called subscribers' number. Of course this is not necessary but a number of registers may be provided with a common translating means in accordance with the description of the Swedish Patent No. 139,655. Thus the register is connected to the translator, transmits the number of the called subscriber or exchange to the translator and receives from the translator a new registering, indicating which signals are to be transmitted for the connection of the communication. The invention eliminates to a large extent the need of common translating means but a co-operation with such devices is not excluded.

In Fig. 2 there is shown a link circuit N, which through a register finder RS is connected to a register REG. The calling subscriber A1 in Fig. 1 is connected through the wires *a*1–*b*1 to a relay set FOR, which contains the conventional relays for receiving impulse series from the dial of the subscriber and for registering these in a cross bar switch containing a number of operating bars B1–B4, one for each digit, and ten selecting magnets S0–S9.

The operating bar B1 has four contact strips D1–D4 and the operating bars B2, B3 and B4 each two contact strips D5–D6, D7–D8 and D9–D10, respectively, D2, D3, D5, D7 and D9 of said strips being intended for inverted impulse translation for the machine-driven selectors GV and LV.

Here it is supposed that the main exchange H comprises 2000 subscribers having the subscribers' numbers 2000–3999, that the tandem exchange K comprises 300 subscribers having the subscribers' numbers 1000–1299 and that the terminal exchange E comprises 200 subscribers having the numbers 1800–1999. The traffic channel through the line L1 is intended for 1000 subscribers and thus two outlets from the group selector GV are united into one traffic channel. The translating circuits of the register are at the connection of communications within the main and completely conventional; they have therefore not been indicated in the figure. The subscriber of the apparatus A1 in Fig. 1 is supposed to call the apparatus A4, the number of which is supposed to be 1911. The first two digits 19 are registered in the register. The contacts 211—214, 221—222 and the contact 220 are closed when the operating magnets of the operating bars B1 and B2 attract their armatures. A starting circuit over the contact 220 and 201 is closed to a relay set BOR which contains conventional relays for setting the machine-driven selectors of the main exchange under inverted impulse control. The group selector GV is started by a circuit through the contact 206 and the wire *a*2 and inverted impulses arrive through the wire *b*2 and the contact 208 and are counted in on relays in the relay set BOR. When the right number of inverted impulses has arrived, a circuit is closed from (+) in the switch SOR, position 1 in the link wiper, the contact 221 and 212 of a translating relay in BOR, which stops the group selector. The group selector GV selects a free line, e.g. L1. The relay F1 in the relay set TL1 is energized in a circuit through the wires *c*, the upper winding on the relay F1, the contact 321, to minus. The contacts 311—313 are actuated. The relay F2 attracts its armature. The contacts 321—322 are actuated.

At the same time the relays of the relay set BOR advances the switch SOR one step, from position 1 to position 2, by a current flow through the magnet OM. The contact *m* for resetting the switch SOR, when the register is released, is closed. The relay R20 is energized in the following circuit: (+), the link wiper in the switch SOR position 2, the winding on the relay R20, the contacts 211 and 220, to minus. The contacts 201—208 are actuated. The relay set BOR is disconnected by the contacts 201, 206 and 208 and the relay set R1–R19 according to Fig. 3 is connected to the wires *a*2–*b*2 through the contacts 205 and 207. The wires *a*2–*b*2 are connected through the register finder RS, the link circuit N and the group selector GV with the line L1 and its relays set F4–F7 according to Fig. 4.

Then no new switching operation is started until all four digits in the calling subscriber's number have been registered in the register. When this has occurred, the contacts 231—233 are closed and finally the contacts 241—242 and 240 will be closed. The relay R15 is energized through the contacts 240 and 202. The contacts 150—152 are closed. In Figs. 2–4 (+) and (−) indicate the poles of the exchange battery, the symbol "ground" indicating the center of the exchange battery, which here is grounded. The following circuit is closed: ground, the contacts 165, 151 and 205, the wire *a*, the contacts 341 and 351, the winding on the relay F5, to minus. The relay F5 which is a calling relay attracts its armature. The contacts 351—355 are actuated. The relay F5 is then held in a circuit through the contacts 242 and 352. The contacts 355 close a circuit from a source of current VB by means of a high resistance *r*11 which belongs to the marker M1, through the contacts 355 and 373 and the ignition path of a glow discharge tube G, to minus. All these lines, which like the line L1 may be connected to the marker M1, have a glow discharge tube G and only one of these glow discharge tubes at a time may be ignited due to the high common resistance *r*11. If the marker M1 is free, the ignition path of the glow discharge G is ignited and then also its main path. The relay F6 is energized in a circuit from an auxiliary battery VA, through the contact 354, the winding on the relay F6, the contact 372, the glow discharge tube G, to minus. The contacts 361—365 are actuated. The following circuit is completed: ground, the winding on the relay P5, the contact 461, the rectifier *r*13, the contacts 401, 471 and 364, the wire *b*, the contact 333, GV, N, RS, the wire $b2$, the contacts 207, 152 and 167, the winding on the relay R17, the contact 181, to minus. The relay R17 is a high resistance control relay which is energized in said circuit, whereas the relay PR is not operated. The contacts 171 are closed. The relay R16 is energized and operates the contacts 162—167. Then the relay R16 is held in a circuit through the contacts 121, 141, 163 and 150.

The contact 162 closes a circuit for the controlling relay R18, which is a signal transmitting relay having two windings opposing each other, one of said windings being connected in series with a condenser $Co$ due to which the relay becomes both slow-releasing and slow-attracting.

As now the switch SOR is in the position 2, a circuit is closed from + through the intermediate wiper on SOR, position 2, the contact strip D6, the contact 222 to the relay R10, which is energized and has operated the contact 101. During the make-time of the relay R18 the following circuit is completed: (+), the contacts 101, 184, 164, 151 and 205, the wire $a2$, RS, N, GV, the wire $a$, the contacts 341, 362, 474 and 404, the windings on the polarized rceeiving relay P1 and the receiving relay P2, to ground. Both the relay P1 and the relay P2 are operated. The contacts 411 and 421—422 are actuated. The relay P2 is energized and a circuit, which indicates the digit 9, is closed through the contacts 421, 431, 453 and 463 to registering relays in a relay set MR in the marker M1. The registering relay MR determines the answering signal and as the digit 9 indicates that the communication concerns a subscriber in the terminal station E, the digit 9 is to be repeated.

The marker M1 sets the selectors GP1–GS1 to a line L2, operates the relay P7 and P9 and closes thereafter a circuit through the wire $c3$, the contacts 365 and 353 through the winding on the relay F7, which is energized. The contacts 371—373 are actuated. The relay F6 releases its armature, the marker M1 is released and the line L1 is connected to the line L2 through the contacts 361 and 363, GP1 and GS1. Upon energization of the relays P7 and P9, the contacts 471—475 and 491 were actuated and an answering signal is sent over the line L1 to the register REG immediately before the relay F6 releases the marker M1.

In the register REG the relay R19 is in the meantime operated in a circuit through the contacts 182 and 162. The relay R18 is energized and operates the contacts 181—186, the current of the relay R19 is disconnected by the contact 182 and during the release time of the relay R19 the line L1 is connected to ground through the resistances $r3$ and $r4$, the contacts 191 and 193, 183 and 185, 164 and 166, 151 and 152, the wires $a2$ and $b2$. As a result, electrical charges of the line are removed, which have built up during the sending of the signal 9 before the relays R11–R14 have been connected to the line L1. During the answering signal from the marker M1 the following circuit is completed: (+), the contacts 491, 475, 362 and 341, the $a$-wire, the contact 331, GV, N, RS, the wire $a2$, the contacts 205, 151, 164, 183 and 192, the rectifier $r6$, the winding on the relay R12, to ground. The relay R12 operates the contacts 121—122. The contact 121 breaks the current of the relay R16. The relays R16 and R18 release their armatures.

The line L1 is now connected to the line L2 having a line equipment T12 which is completely equal to the relays F1–F3 in the tandem exchange K and a line equipment R12 which is completely equal to the relays F4–F7 and the glow discharge tube G in the terminal station E. The operation described above is repeated with the difference that the digit 9 is now sent to the marker M2, which transmits an answering signal by operation of the relays P7 and P11. The relay R14 in the register is energized in the following circuit: (+), the contacts 400, 472 and 364, the $b$-wire, the contact 333, GV, N, RS, the wire $b2$, the contacts 207, 152, 166, 185 and 194, the rectifier $r8$, winding on the relay R14, to ground. The contacts 141—143 are actuated. The current through the relay R16 is interrupted by the contact 141. During the release time for the relay R16 the magnet OM receives a current flow through the contacts 121 and 142 and moves the switch SOR from position 2 to position 3. The relay set MR in the marker M2 is so constructed that the duration of the answering signal is greater than the release time of the relay R16 but less than the sum of the release time for R16 and R18. When the relay P7 was energized, the relay P2 was energized through the contact 473 and operates the contacts 401—404. When the relay P7 releases its armature after the end of the answering signal the lines L1 and L2 are connected to ground through the resistances $r14$ and $r15$, the contacts 402 and 403, 471 and 474, and 362 and 364 in the station E. During the release time for the relay P12 the lines will thus be cleared of electrical charges existing after the end of the answering signal.

After the relay P12 has released its armature, the relay R17 is again connected to the register in series with the relay P5 as has been described above and the digit 1 is transmitted. Thus the relay P2 is operated in a circuit from (+), the intermediate wiper on the switch SOR, position 3, the contact strip D8, the contact 232, the winding on the relay R2, to minus. The signal consists in current over both speech wires $a$ and $b$ from ground through the relays P2, P1 and P5, respectively, in the marker M2, to minus through the contacts 21 and 22 on the relay R1 in the register REG. The relays P1, P2 and P5 are energized. The contacts 411, 421—422, 451—459 are actuated. The relay P2 operates the contacts 431—433. The digit 1 is marked. The signal is received and is registered in the relay set MR in the marker M2 which again by means of a back signal operates the relay R14, the last digit 1 being then transmitted. Thus the switch is in the position 4 and the relay R2 is energized in a circuit through the contact strip D10, the contact 242. After the last digit has been registered in the marker M2 the marker tests the condition in the called subscriber's apparatus A4. If the apparatus A4 is free, the relays R7 and R8 are operated in the marker M2. The following circuit is completed: ground, the winding on the relay R11, the rectifier $r5$, the contacts 192, 183, 164, 151 and 205, the wire $a2$, RS, N, GV, the contact 331, the $a$-wire of the line L1, the contact 361, the $a$-wire of the line L2, the contacts 362, 475 and 481, to minus. The relay R11 operates the contact 111 which closes a circuit through the wire $d1$ of a relay in the link circuit N, which releases the register and sets up a communication between the apparatus A1 and the line L1. At the same time the marker M2 sets the selector GP2, GS2 and SLV2 so that a communication is obtained between the line L2 and the apparatus A4.

If the apparatus A4 is busy, the relays R7 and P10 are operated in the marker M2. The contacts 410 and 471–475 are actuated. The relay R13 in the register REG is operated in a circuit through the rectifier $r7$, the $b$-wires of the lines L1 and L2 and the contact 410 in the marker M2. The contacts 141–132 are actuated. The contact 132 breaks a circuit through the wire $c2$, RS and N to a holding relay for the group selector GV which has been operated at the setting of the group selector GV and which is now released, GV being thereby restored. The register is released, as has been described above, by the contact 131 closing a circuit through the wire $d1$. The calling subscriber at A1 receives no communication through the group selector GV but is connected to a buzzer which sends the busy tone.

When the group selector GV is restored, due to busy condition or at the end of the communication, the relay F1 is released on the outgoing side of the line L1. The relay F2 is slow-operating and slow-releasing and thus the relay F3 is energized during the release time of the relay F2. The contacts 331—334 are actuated. An alternating current source is connected to the line L1, operates the relay F4 through the condenser C1 and the rectifier bridge *r*10. The relay F4 operates the contacts 341—342. The current for holding the relay F5 is disconnected. The relay F5–F7 release their armatures. The selectors GP1 and GS1 are restored. The object of the contact 341 is to prevent the alternating current signal to reach the called apparatus. A completely analogous disconnection sequence is repeated for the line L2.

It is easy to perceive, with the guidance of the above, how different digits 0–9 may be transmitted from the register REG to the relay set MR in a marker by operation of the relays P1–P6, which operate the contacts 411—468. The relays P5 and P6 cut each other off by means of the contacts 451 and 461, respectively, so as to avoid being slow-releasing through a circuit through the rectifiers *r*12 and *r*13, the contacts 451 and 461 and the windings on the relays P5 and P6.

The relay P1 is polarized and closes one of the contacts 411—412 dependent on the direction of the directive current. The relay P1 is operated even if the resistance *r*1 in Fig. 4 is connected at the sending of the digits 4–6 whereas the relay P2 is not energized when the resistance *r*1 is connected. Likewise it is easy to perceive how different answering signals may be produced by means of the relays P7–P11. By operating the relays P9 and P11 simultaneously a special signal is obtained which means that the whole subscriber's number should be repeated. In this case the relays R12 and R14 are operated in the register. The contacts 121—122 and 141—143 are actuated. The following circuit for the magnet OM is closed: (+), the contacts 122 and 143, the right contact row in the switch SOR, one of the positions 2–5, the contact 200, the winding on the magnet OM, to minus. The contact 200 is a self-operating contact and therefore the magnet OM advances the switch SOR to the position 6. Then all the digits of the subscriber's number are transmitted, the switch SOR connecting the first digit in position 6, the second in position 7, the third in position 8 and the fourth in position 9. Repeating of some digit may of course occur also now.

When the register sets the machine-driven selectors GV and LV, only three movements are necessary. The group selector GV is set when the switch SOR is in position 1. The position 2 passes the switch because the relay R20 in this case is not energized and a circuit is formed from (+), over the intermediate contact arc on SOR, position 2, the contact 204, the right contact arc on SOR, the contact 200, the winding on the magnet OM, to minus, said circuit moving the switch past the position 2. In position 3 the line selector LV is set to turn radially into position 4. The translating circuits are only indicated by the contact strips D7 and D9.

We claim:

1. In an automatic telephone system, in combination, an originating register, a switching stage composed of cross-bar switches, a marker, a two-conductor trunk line terminating in said switching stage, means connecting said register to said trunk line, means connecting said switching stage to said marker, signal receiving means in said marker connected between ground and the two conductors of said trunk line, contacts controlling signal transmitting relays in the register for transmitting consecutive signals through said trunk line to said signal receiving means by connecting different potentials between ground and the two conductors of said trunk line, an initiating relay means in said register including a relay having a high ohmic resistance connected between ground and one of the conductors of said trunk line in series with a potential, said high resistance relay operating each time said signal receiving relays in the marker are connected to the register, and said initiating relay means switching said trunk line conductors to contacts on said signal transmitting relays for the transmission of a signal to the marker.

2. An automatic telephone system as described in claim 1, and also comprising signal receiving relays in said originating register, back signal transmitting means in the marker, a control relay in the register switching the trunk line conductors to said signal receiving relays upon the transmission of a signal, a control relay in the marker switching the trunk line conductors to said back signal transmitting means upon receiving a signal, means actuating the back signal transmitting means in the marker in response to the received signal, the receipt of a back signal by the signal receiving relays in the register causing switching of the register to repeat at least the last transmitted signal and the receipt of another back signal by the signal receiving relays in the register causing switching of the register to transmit the consecutive signal.

References Cited in the file of this patent

UNITED STATES PATENTS

| | | |
|---|---|---|
| 2,534,822 | Jacobaeus | Dec. 19, 1950 |
| 2,636,945 | Den Hertog et al. | Apr. 28, 1953 |